United States Patent

Waldruche de Montremy

3,687,534
[45] Aug. 29, 1972

[54] STEREOSCOPIC VIEWING EQUIPMENT

[72] Inventor: Jacques Waldruche de Montremy, Rueil-Malmaison, France

[73] Assignee: Societe Francaise d'Optique et de Mecanique S.F.O.M., Rueil-Malmaison, France

[22] Filed: Dec. 5, 1969

[21] Appl. No.: 882,621

[30] Foreign Application Priority Data

Dec. 12, 1968 France....................68177038

[52] U.S. Cl..........................................353/7, 33/1 A
[51] Int. Cl..............................................G03b 21/00
[58] Field of Search ...................33/1 AP; 353/6, 7, 8

[56] References Cited

UNITED STATES PATENTS 3,551,041  12/1970  McGivern......................353/6
3,246,560  4/1966   Birnbaum et al. ............353/6
3,486,820  12/1969  Blachut et al................355/52

OTHER PUBLICATIONS

IBM Technical Disclosure Bulletin, Random Access Static Character Generator, Vol. 10, No. 2 July, 1967

*Primary Examiner*—William D. Martin, Jr.
*Attorney*—Waters, Roditi, Schwartz & Nissen

[57] ABSTRACT

A stereoscopic viewing instrument has a screen movable parallel and perpendicular to its support base. Two optical projectors project a stereoscopic pair of photographs on to the screen, the projectors being possibly coupled with a pair of shutter devices. To enable an observer to view the projected images from unrestricted positions, between the observer and the screen are interposed a bundle of transparent glass fibers forming a light-wave guide to transmit the images to an enclosure on to a synchronized disc having equal deflecting and transmitting sectors therein. A mirror and eyepiece direct the respective beams into the observer's fields of view. The projectors and eyepieces may have corresponding associated color filters. Alternatively, the light-wave guide may be replaced by a television circuit having a camera fixed to the screen and a receiver, with a pair of perpendicular revolving opaque plates or color filters synchronized with respective shutter devices.

2 Claims, 3 Drawing Figures

PATENTED AUG 29 1972

STEREOSCOPIC VIEWING EQUIPMENT

The present invention relates to stereoscopic viewing equipment of the kind comprising a movable screen on to which the images of a stereoscopic pair of photographs are projected and viewing means for providing an observer with stereoscopic vision of the images obtained on said movable screen, the latter being movable parallel and perpendicularly to a fixed plane in order to permit observation, study and possible photography of the different parts of the subject to which the stereoscopic pair relates.

Stereoscopic viewing equipment of the kind referred to is used for example for making large-size orthophotographic maps from aerial photographs forming a stereoscopic pair.

When the movable screen is at a distance from him, the observer, who adjusts its height for each projected part of the subject so that the images of those parts appear with maximum sharpness on the screen, must adopt an uncomfortable working position, especially when he is seated beside the stereoscopic viewing instrument.

Moreover the observer may have to view a distant movable screen at a grazing angle of incidence, which adversely affects stereoscopic viewing of the images formed on the screen.

These drawbacks arise regardless of the manner in which stereoscopic viewing equipment is used, whenever the projected subject is of large size, and are particularly acute when observations are of long duration.

It is the principal object of this invention to provide an improved stereoscopic viewing instrument devoid of these drawbacks.

A stereoscopic viewing instrument according to this invention is principally characterized by the fact that it includes picture-transmitting means interposed between the observer's fields of view and the movable screen and capable of transmitting the images formed on the screen to the observer, whose position is independent of that of the movable screen, said viewing means being so devised as to provide the observer with stereoscopic vision of the pictures thus transmitted to him.

In a preferred embodiment, said transmitting means is a flexible lightwave guide formed by a bundle of transparent glass fibers, of which one end is fast with the movable screen and receives on its terminal section the images formed thereon and of which the terminal section of the other end is viewed by the observer.

In accordance with another preferred embodiment, said transmitting means are a television circuit comprising a camera fast with the movable screen that analyses the images formed on the latter whereby to generate a video signal, and a receiver to which the video signal is applied and which displays said images to the observer.

The description which follows with reference to the accompanying non-limitative exemplary drawings will give a clear understanding of how the invention can be carried into practice.

Figure 1:
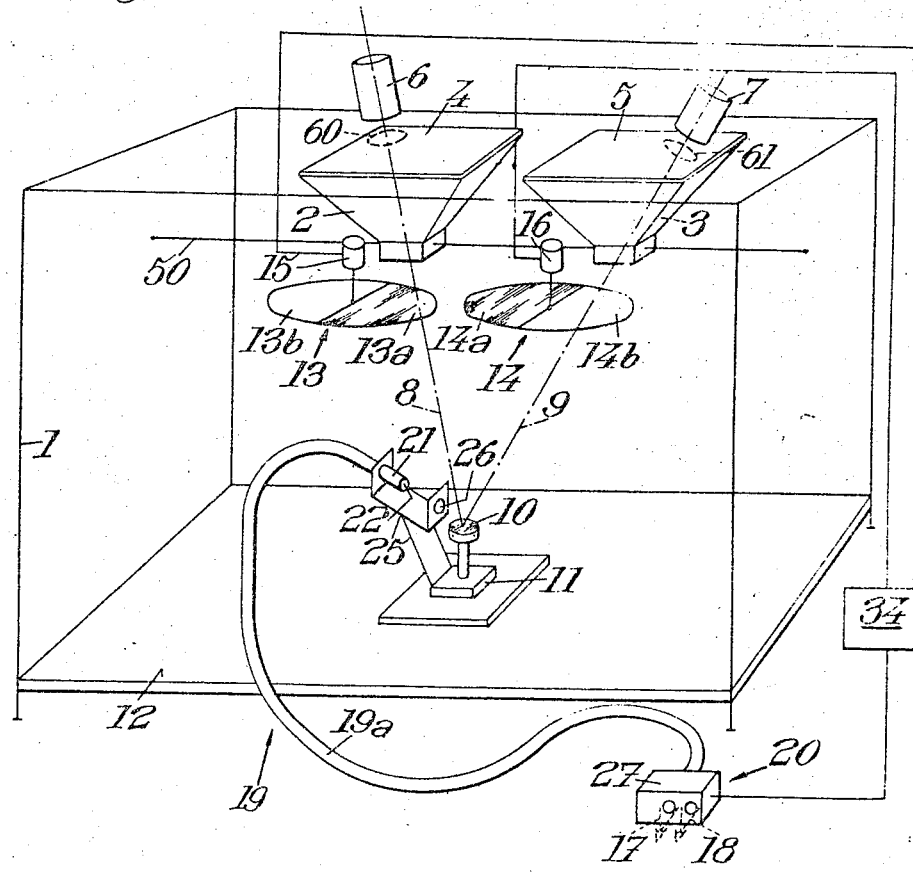
FIG. 1 is a perspective diagrammatic illustration of a first embodiment of a stereoscopic viewing instrument according to this invention.

A stereoscopic viewing instrument devised according to this invention, for instance for viewing aerial photographs forming a stereoscopic pair, includes a conventional housing 1 containing a system for optically projecting the two photographs of a stereoscopic pair, which system consists of two chambers 2 and 3 fixed to housing 1 by a support 50 and having the photographs 4 and 5 positioned therein and of two projectors 6 and 7 respectively capable of projecting optical beams 8 and 9 through portions of the photographs 4 and 5 that correspond to the same portion of the subject to which the stereoscopic pair relates, the beams 8 and 9 being counterparts of the beams which corresponded to the same portion of the subject at the time of photographing.

The beams 8 and 9 project images on a movable screen 10 which is mounted on a support 11 carried on a fixed surface 12 of housing 1.

With such an instrument, a subject photographed on the photographs 4 and 5 can be viewed stereoscopically with the aid of a device which causes the optical beams of white light 8 and 9 issuing from projectors 6 and 7 to be cut off alternately in synchronism with a blanking-off of the fields of view of the observer's eyes, the right eye seeing only the images from the photographs 5 on screen 10, and vice-versa. It should be noted that with this method the photographs 4 and 5 can be in black-and-white or in color.

This is accomplished through the agency of restitution means which include two revolving discs 13 and 14 placed respectively in the fields of projectors 6 and 7 and embodying opaque portions 13a, 14a and transparent portions 13b, 14b of equal area, these discs being rotated by synchronous motors 15 and 16. The fields of view of the observer's eyes can be blanked off by a system of rotating opaque (not shown) arranged at right angles to each other and respectively positioned in the field of view of one of the observer's eyes. When the discs 13, 14 and the opaque plates rotate synchronously, the observer's right eye sees only the images thrown on movable screen 10 by the beam 9, while the observer's left eye sees only the images thrown on screen 10 by the beam 8, whereby the observer is afforded stereoscopic vision of the portion of the subject projected on the screen 10.

With an instrument of the kind shown in Figure 1 but devoid of the discs 13 and 14 and the motors 15 and 16, stereoscopic viewing means utilizing the anaglyphs method can be employed in the case of a subject photographed in black-and-white. This can be done by interposing colored filters 60, 61 (shown in broken lines in Figure 1) between projectors 6, 7 and photographs 4, 5, the observer then viewing the images thrown on screen 10 through corresponding color filters (not shown) placed before his eyes.

The stereoscopic viewing instrument further includes means (not shown) for imparting motion to projectors 6 and 7 as a function of the movements of movable screen 10, such that the beams 8 and 9 be invariably directed towards screen 10 and be counterparts of the corresponding optical beams used for photographing the prints 4 and 5.

The movements of the screen 10 parallel and perpendicular to the fixed surface 12 will then make it possible to observe, study and possibly photograph the various portions of the subject projected on screen 10.

It will be appreciated that viewing in this way compels an observer placed beside the housing 1 to assume an uncomfortable position when the projected subject is of large dimensions and the movable screen 10 is placed in a location remote from the observer. In this case, furthermore, the observer must view the screen 10 at a shallow angle of incidence which could result in a poor stereoscopic effect.

A viewing instrument according to this invention overcomes these drawbacks and is characterized mainly in that it includes image-transmitting means 19 which are interposed between an observer's fields of view 17 and 18 and the movable screen 10 and which are capable of transmitting to such an observer occupying a position independent of that of the screen 10 the images thrown thereon, the picture viewing means being so devised that they give the observer stereoscopic vision of the images transmitted to him.

Figure 2:
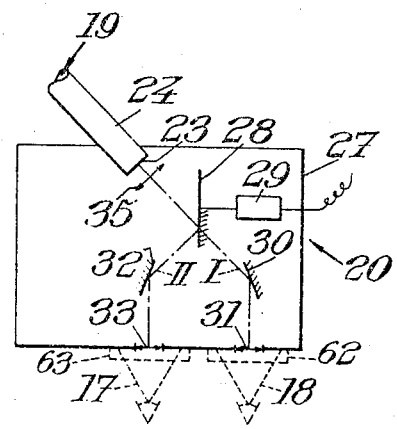
FIG. 2 is a detail view with partial cutaway of a portion of Figure 1.

In a preferred embodiment shown in Figures 1 and 2, the means 19 consist of a flexible light-wave guide 19a of which one end 21 is fast with movable screen 10 and receives on its terminal section 22 the images thrown on screen 10 and of which the terminal section 23 (Figure 2) of the other end 24 is viewed by the observer.

The light-wave guide may be of any convenient type, such as a bundle of transparent glass fibers.

The end 21 of light-wave guide 19a is fixed to a support 25 in such manner that the normal to the terminal section 22 is directed towards movable screen 10 and forms an angle substantially less than 90° with the normal to screen 10, and a lens 26 interposed between terminal section 22 and movable screen 10 is fixedly mounted on support 25 and forms the image thrown on screen 10 on terminal section 22.

In a viewing instrument of the kind shown in Figure 1, in which the optical beams 8 and 9 are alternately cut off by means of revolving discs 13 and 14 driven by the synchronous motors 15 and 16, the images thrown on the terminal section 23 of light-wave guide 19a originate alternately from the images projected on to movable screen 10 by the beams 8 and 9. In order to give the observer stereoscopic vision of the images transmitted to him on terminal section 23, the picture restitution means include, in addition to revolving discs 13 and 14, a device 20 which is shown in detail in Figure 2 and which preferably includes:

an enclosure 27 (shown in Figure 2 with its lid removed) into which the end 24 of light-wave guide 19a penetrates;

a disc 28 rotated by a synchronous motor 29 and comprising two equal sectors, the one transparent and the other reflecting, said disc being so positioned within enclosure 27 that it alternately deflects or transmits the light beam issuing through a lens 35 of light-wave guide 19a;

and a mirror 30 capable of directing the undeflected beam I towards an eyepiece 31, and a mirror 32 capable of directing the reflected beam II towards an eyepiece 33.

The disc 28 is so rotated that the images formed on movable screen 10 by the beam 9 reach the eyepiece 31 corresponding to the field of view 18 of the observer's right eye and the images formed on movable screen 10 by the beam 8 reach the eyepiece 33 corresponding to the field of view 17 of the observer's left eye, whereby the observer is afforded stereoscopic vision of the portions of the subject projected on to movable screen 10.

The rotations of discs 13, 14 and 28 are synchronized preferably by means of a power pack 34 which feeds the three synchronous motors 15, 16 and 29 in synchronism, and the rotary speeds of these discs are chosen so that the observer enjoys flicker-free viewing.

In the case of a stereoscopic viewing instrument utilizing the anaglyphs method, the picture restitution means include, in addition to a first pair of color filters 60, 61 positioned between projectors 6, 7 and prints 4, 5, an optical device which may be similar to the device 20 and which is capable of directing on to the two eyepieces 31 and 33 the images transmitted to the terminal section 23 of light-wave guide 19a.

In such cases the device 20 is equipped with a second pair of filters 62, 63 (shown in broken lines in Figure 2) which are colored identically with color filters 60, 61 and which are respectively associated to said eyepieces 31, 33 in such manner that the observer sees with his right eye the images of one color (e.g. red) formed on movable screen 10 and with his left eye the images of another color (blue-green) formed on screen 10.

Figure 3:
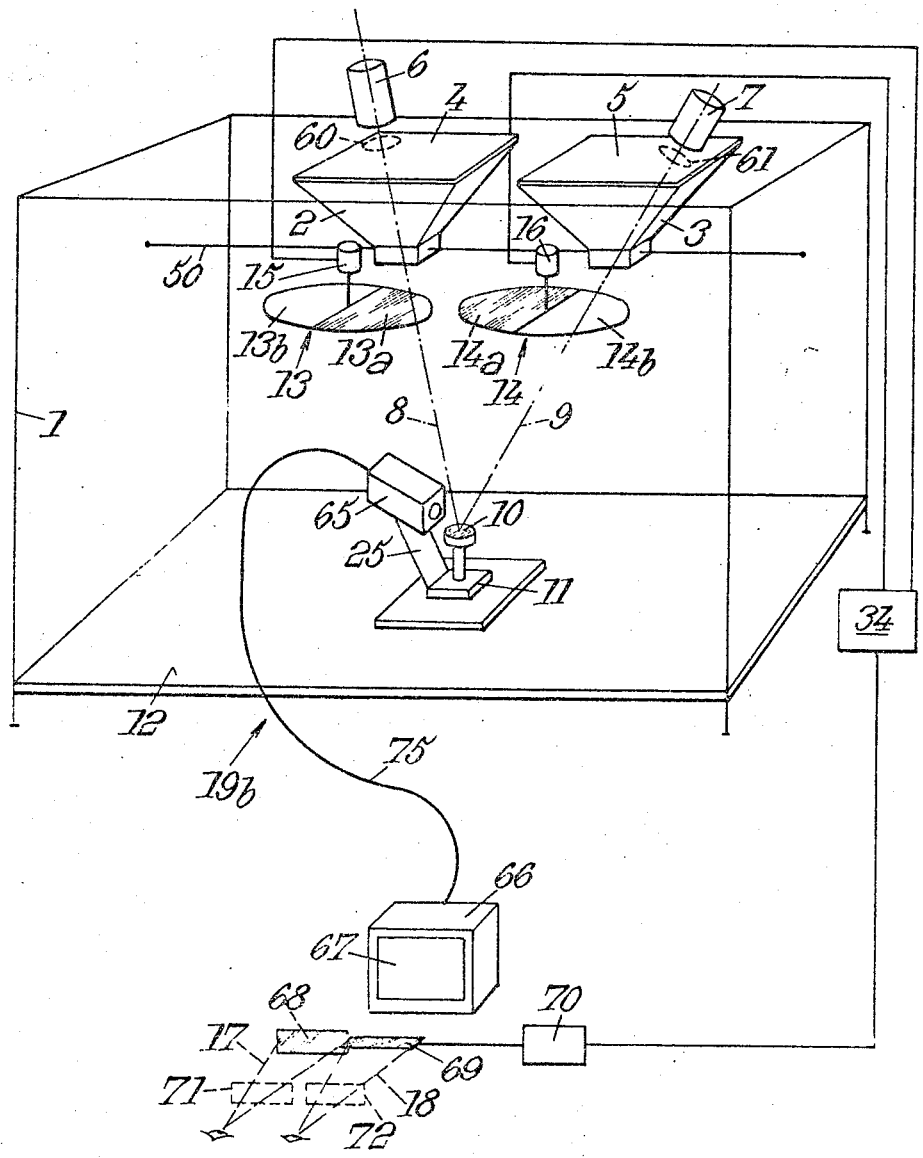
FIG. 3 is a schematic perspective illustration of an alternative form of embodiment of a stereoscopic viewing instrument according to the present invention.

In accordance with another preferred embodiment shown in Figure 3, said transmission means 19 consist of a television circuit 19b comprising a television camera 65 which is fast with the movable screen 10 and which analyses the images formed thereon so as to generate a video signal, and a receiver 66 to which the video signal is supplied and which restitutes for the observer the images formed on screen 67. The video signal is transmitted from camera 65 to receiver 66 over a cable 75 for example.

In cases where the viewing apparatus of Figure 3 alternately cuts off the optical beams 8 and 9 by means of rotating discs 13 and 14 driven by synchronous motors 15 and 16, the picture restitution means further include with advantage a system of rotating opaque plates 68, 69 at right angles to each other, positioned before the observer's fields of view 17 and 18 respectively, the plates 68, 69 being rotated by a synchronous motor 70 in synchronism with the alternating cutting-off of beams 8 and 9, whereby one of the observer's eyes sees the images corresponding to one of the beams and his other eye the images corresponding to the other beam.

Synchronization between the rotations of discs 13, 14 and plates 68, 69 is effected by the power pack 34 which feeds the three synchronous motors 15, 16 and 70 in synchronism, and the rotary speeds of these motors are chosen so that the observer enjoys flicker-free vision of the images appearing on screen 67.

With such a viewing apparatus it is possible to use a black-and-white television circuit, or, if the prints 4 and 5 are color prints, a color television circuit permitting stereoscopic color viewing of the pictures on said prints.

Where recourse is had to a color television circuit 19b, the picture restitution means may consist of two color filters 60, 61 (shown in broken lines) placed respectively between projectors 6, 7 and the prints 4, 5 of the stereoscopic pair, and of two further color filters 71, 72 (shown in broken lines) placed in the fields of view 17, 18 of the observer viewing the screen 67 of receiver 66.

It will be manifest from the foregoing that, irrespective of the embodiment adopted from among those hereinbefore described, the subject stereoscopic instrument of this invention offers the essential advantage over the prior art instruments of allowing an observer to occupy a comfortable working position from which he or she may, over periods of time which may be of considerable duration, make observations and studies or take measurements and photographs of any part of the subject which the instrument projects on to the movable screen, even if the projected subject is of large size.

It goes without saying that many changes and substitutions of parts may be made in the embodiments specifically described hereinabove, without departing from the spirit and scope of the invention.

What is claimed is:

1. A stereoscopic viewing instrument comprising a movable screen on to which are projected the images of a stereoscopic pair of photographs and picture restituting means positioned between the photographs and an observer providing stereoscopic vision to the observer of the images thrown on said screen, which screen is movable, parallel and perpendicular to a fixed plane, to permit observation, study and photography of the different parts of the subject to which the stereoscopic pair relates, image-transmitting means being interposed between the fields of view of the respective eyes of the observer and the movable screen and being capable of transmitting the images thrown on said screen to the observer when the latter occupies a position independent of that of said screen, said image-transmitting means being a flexible light-wave guide formed by a bundle of transparent fibers of which one end is fast with the movable screen and receives on its terminal section the images thrown on said screen and of which the other end has its terminal section viewed by the observer, said picture restituting means including a device for alternately occluding the projections of the two photographs of the stereoscopic pair and also including a device which comprises:

an enclosure into which is inserted that end of the light-wave guide to which the images are transmitted, a disc rotated in synchronism with said alternate occlusions and embodying two equal respectively transparent and reflecting sectors, said disc being so disposed in said enclosure as to alternately deflect or transmit the light beam from said light-wave guide, and two systems formed respectively of a mirror and an eye-piece which are capable of directing the deflected or transmitted beams into the observer's respective fields of view.

2. A stereoscopic viewing instrument according to claim 1, wherein the restituting means include a first pair of color filters capable of respectively coloring the projections of the two photographs of the stereoscopic pair and also include a device for directing the images transmitted by the light-wave guide towards two eyepieces, said device comprising a second pair of color filters associated with said respective eyepieces, and the filters of said second pair being colored identically with the filters of said first pair.

* * * * *